United States Patent Office 3,423,324
Patented Jan. 21, 1969

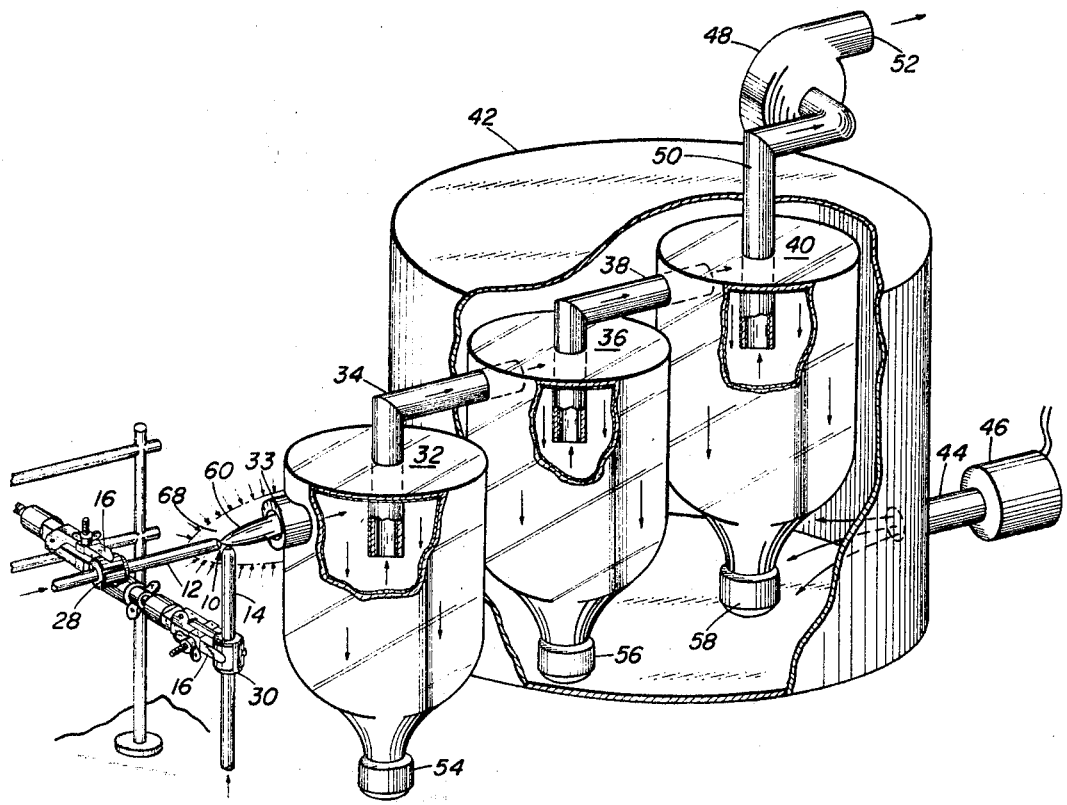
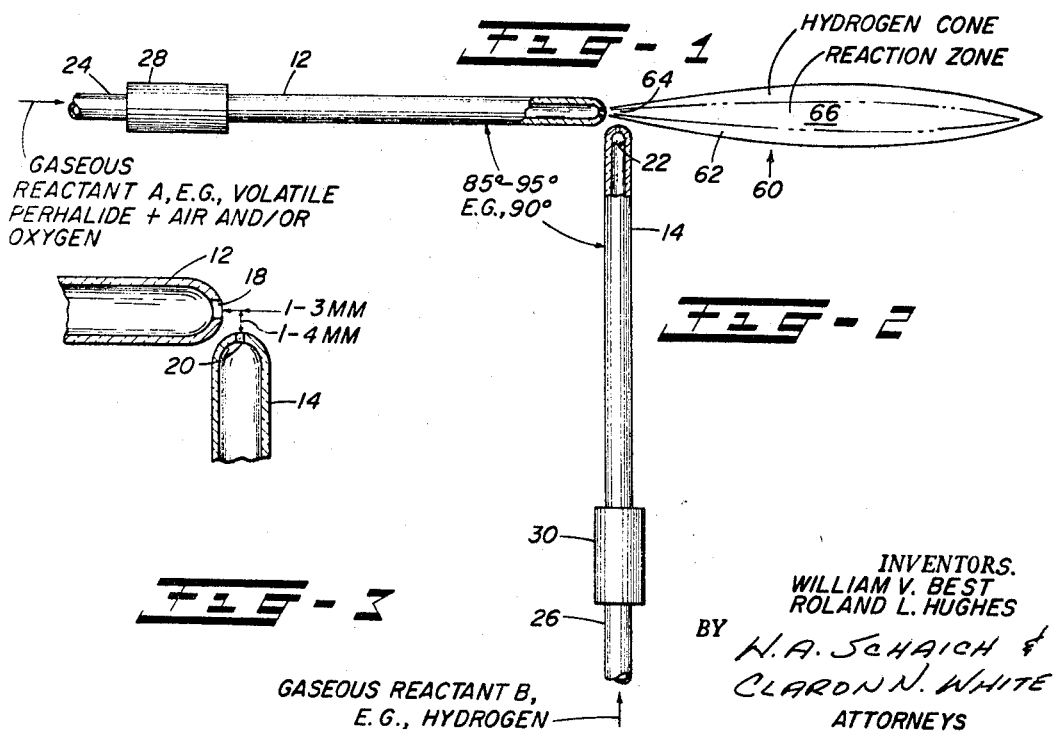

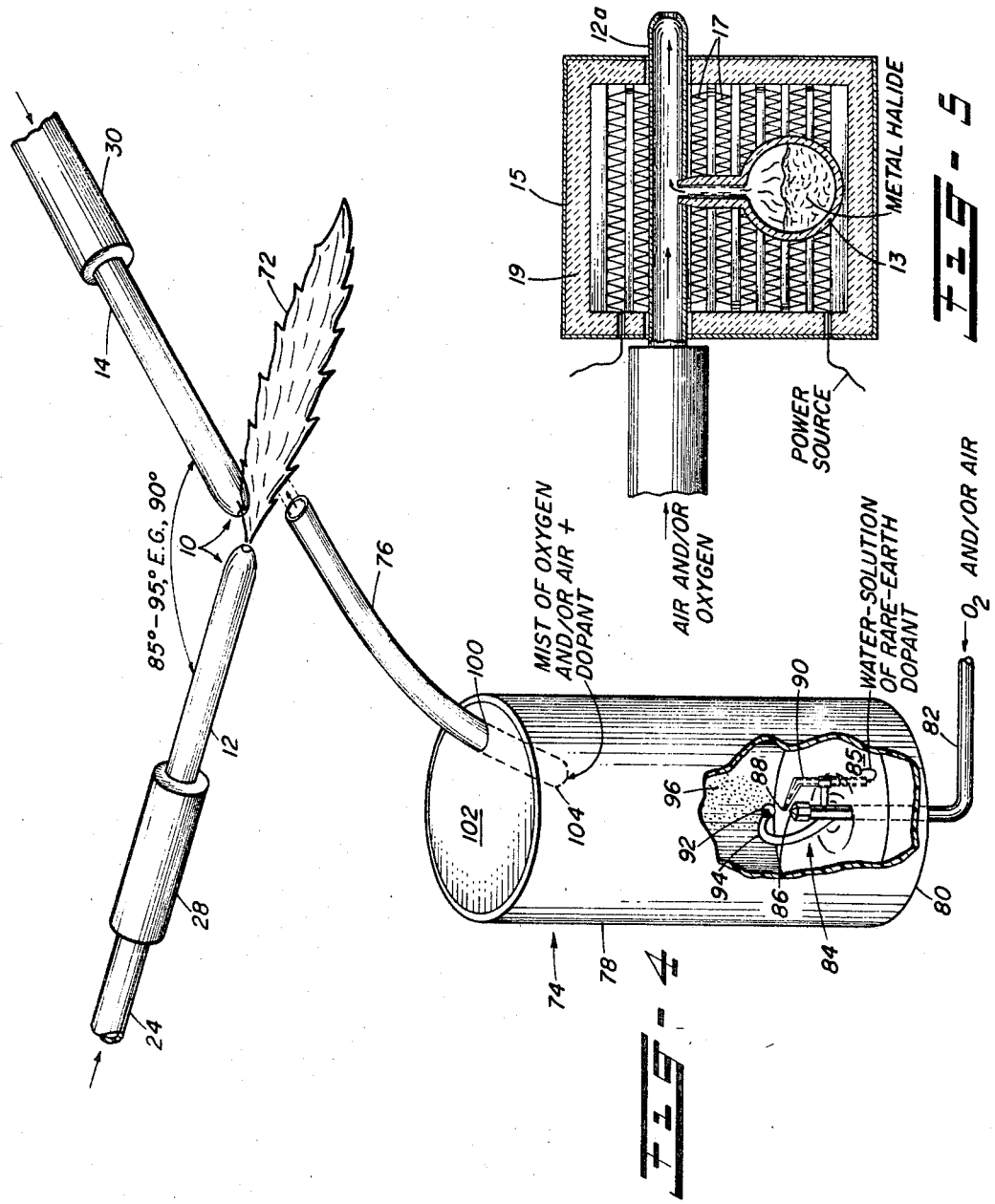

3,423,324
APPARATUS AND METHOD FOR PRODUCING
SILICA AND OTHER OXIDES
William V. Best, Independence, Mo., and Roland L.
Hughes, Leawood, Kans., assignors to Owens-
Illinois, Inc., a corporation of Ohio
Filed Nov. 20, 1964, Ser. No. 412,614
U.S. Cl. 252—301.4                         21 Claims
Int. Cl. C01b 33/12; F23d 21/00

This invention relates broadly to the production of finely divided oxides, more particularly oxides of metals and metalloids, e.g., silica. More particularly, the aforesaid finely divided oxides are derived from at least one perhalide (e.g., two, three or any desired higher number of perhalides) selected from the group consisting of volatile (volatilizable) perhalides of metals and metalloids.

By practicing this invention finely divided oxides of exceptionally high purity, i.e., ultrapure, can be produced in unmodified state or form; or in the form of modified oxides such as silica intimately associated with a rare-earth-metal component, e.g., a rare-earth oxide, that has been formed in situ by conversion of its corresponding salt. The scope of the invention includes both apparatus and method features.

It was known prior to the present invention that perhalides of metals and metalloids, e.g., silicon tetrachloride, could be hydrolyzed and dehydrated in an oxyhydrogen flame to produce a finely divided oxide of the metal or metalloid, specifically finely divided silica. In general, the various burners heretofore used or suggested for use for this purpose have been devices of the so-called "concentric-diffusion" type or design, or of the premixed turbulent burner design (see, for example, U.S. Patent No. 2,990,249, dated June 27, 1961, and the brief discussion of the prior art in the second paragraph). The design or construction of the prior-art devices resulted in inherent disadvantages. One of the most serious of these disadvantages was that one could not obtain from the prior-art burners finely divided oxides of silicon, or oxides of other metalloids or metals, having the high degree of purity required for certain products made from such oxides that are to be used in, for example, electronic, optical and other applications in the space, missile, communications and other industries.

In marked contrast to the results obtained from the prior-art burners described in the preceding paragraph, the burner design and operation of the present invention make it possible to produce, for example, very finely divided silica having a lower content of total metal-oxide impurities than heretofore has been commercially available. For instance, utilizing the apparatus and technique of this invention, we have made silicon dioxide by hydrolysis of electronic-grade $SiCl_4$ in an oxygen- or oxygen and air-hydrogen flame that had a total metal-oxide content of less than 20 parts per million (p.p.m.) of oxides of the following metals: Al, Ba, Cu, Fe, Mg, Mn, Ti, Zr, Li, Na and Ca. The particle size of the ultrapure silica material which we have produced ranges, for example, from about 20 m$\mu$ to about 300 m$\mu$, and hence properly may be designated as ultrafine. These results are largely due to the fact that, in practicing the instant invention, we use what is, in effect, a "containerless" flame having a minimum contact area between the burner and the flame zone in carrying out a hydrolysis and subsequent dehydration reatcion, e.g., a reaction between $SiCl_4$ and water in an oxygen- and/or air-hydrogen flame at a temperature of at least about 900° C., and preferably from about 900° C. to about 1200° C.

It is a primary object of the present invention to provide improved apparatus, including both production and collection features, whereby in use one obtains ultrafine, ultrapure oxides of metals and metalloids, more particularly oxides derived from volatile perhalides of metals and metalloids, e.g., silicon dioxide.

Another object of the invention is to provide a relatively simple and economical method of producing the ultrapure oxides briefly described in the preceding paragraph.

Still another object of the invention is to provide a technique, including both method and apparatus features, for modifying the aforementioned ultrapure oxides, e.g., by bringing them into intimate association with a rare earth-metal component that has been formed in situ by conversion of its corresponding metal salt.

Still other objects of the invention will be apparent to those skilled in the art from the description that follows and the accompanying drawing.

The novel features of the invention are set forth in the appended claims. The invention itself, however, will best be understood from reference to the following more detailed description when considered in connection with the accompanying drawing, which is illustrative of a preferred embodiment of the invention, and wherein FIGURE 1 is an isometric view, partly broken away, of the apparatus of the invention including the burner and collection elements;

FIGURE 2 is a view, partly in section, of the feed tubes of the burner and showing the type of flame that is obtained;

FIGURE 3 is an enlarged sectional view of a portion of the burner tips shown in FIGURE 2; and FIGURE 4 is a somewhat schematic, isometric view, partly broken away, showing a modification of the invention.

FIGURE 5 is a sectional view of a modification of a portion of the burner shown in FIGURES 1 and 2 and which is suitable for use when the perhalide reactant has a high boiling point.

The invention will be described for purpose of illustration with particular reference to the preparation of finely divided (ultrafine), ultrapure silica. It will be understood, of course, by those skilled in the art that the invention is equally applicable to the production of other oxides of metals and metalloids, more particularly oxides derived from one or more vilatile perhalides (particularly the volatile perchlorides, perbromides and perfluorides) of metals and metalloids, e.g., oxides of titanium, germanium, boron and tin. No particular advantages ordinarily accrue from the use of volatile periodides although it is not intended to preclude their use in practicing this invention. For economic and other reasons it is preferred to use volatile perchlorides of metals and metalloids in practicing the instant invention.

Referring now more particularly to FIGURES 1, 2 and 3, there is shown by way of illustration in FIGURE 1 apparatus for making oxides of the kind with which this invention is concerned.

As shown in FIGURE 1 there is illustrated a burner 10 consisting essentially of two reactant feed tubes 12 and 14. The tubes of burner 10 are constructed of high temperature-resistant tubing, e.g., fused silica tubing, detachably but rigidly mounted on support 16. The tubes 12 and 14 are arranged at an angle of from 85°–95°, specifically about 90°, to each other, and so that in operation an unconfined (i.e., substantially unconfined except for enveloping gas or gases) reaction zone is formed forward of one of the said reactant tubes.

The tubes 12 and 14 having openings or orifices 18 and 20, respectively, are preferably positioned as shown in FIGURES 2 and 3 when preparing an unmodified silica. When tubes 12 and 14 are each constructed of tubing of, for instance 4 mm. I.D., the diameter of orifice 18 advantageously is 2 mm. while that of orifice 20 is 1 mm. Tube 14 is positioned so that its orifice is slightly forward the orifice of tube 12 and on a lower plane so that, during operation of the burner, a conical-diffusion type of flame is produced. In other words the reactant feed tube positioned in a vertical plane is slightly forward and slightly below the reactant feed tube positioned in a horizontal plane. As shown in FIGURE 3, a suitable arrangement of tubes 12 and 14 with respect to each other is provided by having the orifice of tube 14 from about 1 to 3 mm. forward the orifice of tube 12 and from about 1 to 4 mm. beneath a line which is an extension of the horizontal axis of tube 12. The dimensions just mentioned are measured as indicated in FIGURE 3.

When the burner is employed in the production of oxides that involve the use of a reactant such as hydrogen, a suitable flashback preventor, e.g., a silica-fiber gauze or any other flame-resistant gauze, advantageously is inserted in the tube through which such a reactant passes to the burner. Thus, tube 14 optionally may be provided, as shown in FIGURE 2, with the flashback preventor 22 at any suitable point behind the orifice 20 in order to obviate the possibility of a flashback.

Gaseous reactants A and B, hereafter more fully described, are conducted from a supply source (not shown) to the burner 10 through suitable tubes 24 and 26 connected to fused silica tubes 12 and 14, respectively, by means of fittings 28 and 30, respectively. Tubes 24 and 26 advantageously are made of a polyolefin, specifically polyethylene, while fittings 28 and 30 advantageously are made of a poly(perhalogenated)hydrocarbon, e.g., polytetrafluoroethylene, which is commercially available as Teflon® polytetrafluoroethylene.

From the foregoing description of the burner and from the drawing, especially FIGURE 2 showing the location and shape of the flame produced, it will be seen that the high-temperature reaction zone is isolated from the reactant feed tubes 12 and 14 and from the burner container walls whereby contamination is minimized. It will also be noted that the flame, which is of the conical-diffusion type, is created by careful impingement of two impinging gas streams at a predetermined angle with respect to each other that is within the range of 85°–95°, more particularly from about 88° to about 92°, and specifically about 90°, with respect to each other.

Both a burner- and combination product-collection and by-product disposal assembly are shown in FIGURE 1. In the latter the reaction products from the burner are shown as being collected by a combination of gravitational settling, impingement and agglomeration means in a silica-passivated collection system.

The apparatus shown in FIGURE 1 includes a burner 10 and a collection vessel or container 32 into which the products of the reaction are first discharged. The container 32, which is the first of the series of containers, is provided with an entrance port 33 in a sidewall thereof. During operation, the flame from burner 10 enters this port and discharges product into container 32, this being done while the said flame is blanketed by a secondary gas flow, e.g., air, oxygen, nitrogen, argon, carbon dioxide, helium, etc. Preferably the secondary gas is air.

From container 32 the volatile products pass through conduit 34 into container 36 and thence through conduit 38 into container 40. Containers 36 and 40 are enclosed, during operation of the apparatus, in a suitable metallic jacket, e.g., an aluminum jacket 42. Containers 32, 36 and 40 are fabricated from, or lined with, a suitable high-purity glass such as a borosilicate glass, while the interconnecting conduits 34 and 38 are likewise made from a similar glass.

Instead of a series of containers having interconnecting conduits from the upper portion of each as shown in FIGURE 1, there may be only two such containers, or there may be 4, 5, 6, 7 or any desired higher number as one may prefer or as conditions may require. The metalic jacket 42, however, envelops at least one of the containers that follows the first container 32 in the series; or, as illustrated, the jacket may envelop all containers (specifically two containers as shown in the drawing) after the first one.

During operation of the apparatus the internal temperatures of containers 36 and 40 are raised above 100° C., e.g., to 105°–200° C. or higher by the introduction of heated air, more particularly electrically heated air, that is forced inside the aluminum jacket 42 through the conduit 44 by means of the electric-heat gun 46, e.g., a 1,500-watt heat gun.

Application of external heat to container 32 is not necessary because the burner 10 supplies sufficient heat to this container to maintain an internal temperature above 100° C.

The entire preparation and collection system is exhausted by the exhaust blower 48, e.g., a blower having a maximum capacity of 100 cu. ft./hr. for the system involved in this specific illustration, and by means of which the volatile products are conducted through the conduit 50 to the discharge outlet 52 of the said blower. Conduits 34, 38 and 50 are formed, for example, from a high-purity glass such as borosilicate glass (58 mm. O.D., 1 mm. wall thickness).

The product, e.g., ultrafine, ultrapure silica, which settles to the bottom of each of containers 32, 36 and 40, is recovered by removing the stoppers 54, 56 and 58 from the openings in the bottom of each of the said containers. Such stoppers may be made, for example, of Teflon or similar poly(perhalogenated)ethylene or other perhalogenated olefin.

All seals in the collection system illustrated in FIGURE 1 are made by use of a suitable sealing tape formed of, for example, a poly(perhalogenated)ethylene, specifically Teflon, with an organopolysiloxane (i.e., silicone) adhesive on one side. Such a tape is stable within the temperature range of from −70° C. to 200° C.

Referring now more particularly to FIGURE 5 there is shown a feed reactant tube 12a, which corresponds to tube 12 in FIGURES 1, 2 and 3. A vaporizer 13 made of fused silica is connected to the tube 12a, e.g., to the lower side of said tube as shown. Vaporizeer 13 and the major portion of tube 12a are positioned in an electrical heating furnace 15 provided with electrical heating coils 17, suitably connected to a power source (not shown), and further provided with insulation 19. By means of the electrical coils and thermostatic controls, the furnace can be heated to, and the temperature maintained at, from about 100°–120° C. to about 1000° C.; in other words, at a temperature sufficiently high to vaporize the perhalide of a metal or metalloid that may be charged to the vaporizer 13. The tip of the tube 12a protrudes beyond the front end of the furnace 15, while the rearward end of the said tube extends beyond the opposite end of the furnace, and is connected to a supply source of air and/or oxygen.

The following description relates particularly to the operation of the apparatus illustrated in FIGURES 1, 2 and 3.

In the operation of the apparatus shown in FIGURES 1, 2, 3 and 5, a careful passivation of all the internal surfaces of the silica preparation and collection units with an ultrapure silica that is of a permanent nature is first secured. This coating is deposited by allowing the molecular silica produced in the silicon tetrachloride-oxyhydrogen burner to accumulate on all internal surfaces after the unit has been initially assembled. The product, after removal from the silica unit by gravity flow and scraping with fused silica or polyethylene tubing, is stored in suitable bags, e.g., polyethylene or other polyolefin bags, to preserve ultrahigh purity standards.

Taking the production of ultrafine, ultrapure silica as illustrative of the oxide to be produced in accordance with the present invention, the invention may be illustrated by stating that air and/or oxygen (dewpoint −72° F.) saturated with electronic-grade SiCl₄ (gas feed A) is passed through, for instance, a 2 mm. orifice in fused silica tube 12 under a pressure of a few p.s.i.g., more particularly about 5 p.s.i.g. Pure hydrogen (gas feed B) enters the burning zone in a vertical direction through, for example, a 1 mm. orifice 20 in tube 14. As mentioned hereinbefore, a silica-fiber gauze 22 back of orifice 20 prevents any possibility of a flashback. The result is a "blowpipe"-type flame 60 in which a burning hydrogen cone 62 (FIGURE 2) completely surrounds the SiCl₄ plus air and/or oxygen stream, which is preferably introduced at 64 (FIGURE 2). Hydrolysis and subsequent dehydration of the SiCl₄ plus air and/or oxygen stream occurs at the interface and within the hydrogen cone, for instance in the reaction zone 66. The flame 60 may be enveloped by a mass of a secondary gas 68 (FIGURE 1) from any suitable source (not shown) or, specifically, air from the surrounding atmosphere as best indicated by the arrows in FIGURE 1. The burner products are collected in a silica-passivated collection system as hereinbefore described with reference to FIGURE 2.

During operation of the burner 10 the fused silica tubes remain cool even on the burner tips, especially when silica or other oxide of a metal or metalloid is being produced from a low-boiling perhalide thereof, and the flame zone is virtually isolated from any wall or burner contact. It is believed that this isolation does much to maintain impurities of other metallic oxides at a very low level.

In carrying out the process the flow conditions are preferably kept as close as possible, when silicon tetrachloride is the perhalide reactant, to a ratio of 1 mole of silicon tetrachloride to 2 moles of hydrogen to 1 mole of oxygen in the form either of oxygen alone, or air alone or air plux oxygen. Air from the secondary air stream 68 assures complete combustion of hydrogen to produce water for subsequent hydrolysis of all SiCl₄. When air alone is used, the optimum molar ratio is 1:2:5 moles of SiCl₄:H₂:air, respectively.

The burner can be operated at any stoichiometry in which sufficient hydrogen and oxygen are present to produce a molar ratio of water to SiCl₄ in excess of 2:1. For economic reasons the upper limits of the feed reactants are about 1:10:25 moles of SiCl₄:H₂:air, respectively; or, when oxygen alone is used, about 1:10:5 moles of SiCl₄:H₂:O₂, respectively. Also, for economic reasons, the lower limits of molar ratios of feed reactants are those set forth in the preceding paragraph.

If desired, the burner can be operated using an overall ratio of 2:5:5 moles of SiCl₄:H₂:air, respectively. However, this is not economical since one-half of the silicon tetrachloride is lost with the by-product gases.

In preparing the SiCl₄-containing feed reactant, silicon tetrachloride vapor is mixed with dry oxygen and/or air (dewpoint −72° F.) prior to introduction to the burner in the following manner:

Dry oxygen and/or air is bubbled through a 500 ml. boro-silicate saturater containing electronic-grade SiCl₄. An electrical heater is employed to supply heat to the saturater in order to maintain its contents at a suitable temperature, e.g., from about 10° C. to about 50° C. Feed lines to and from the saturater are constructed of polyethylene tubing. Teflon connections are used to connect the feed lines to the saturater. A Teflon seal is used to provide a gas-tight seal on the body of the saturater.

The modification of the burner design and feed means for the perhalide and accompanying air and/or oxygen that is shown in FIGURE 5 is particularly suitable for use when relatively high-boiling perhalide reactants are used, e.g., zinc chloride (B.P. 732° C.). However, this modification also may be employed with any of the volatile perhalide reactants boiling above ambient temperature and which are used in practicing this invention.

In operation, the bulbular vaporizer 13 is charged with the chosen perhalide reactant either with or without initially heating it below its boiling point before placing it in the furnace 15 and connecting its neck with tube 12a. Furnace 15 advantageously is of the cylindrical, matching-sectional type. The desired flow of air and/or oxygen, which preferably has been preheated (e.g., to a temperature approximately the same as the boiling point of the perhalide reactant), is introduced into the inlet end of tube 12a from a supply source (not shown) after previously having raised the furnace temperature sufficiently high to vaporize the perhalide reactant in the vaporizer. The flow of air and/or oxygen past the opening where the neck of the vaporizer enters the tube 12a has a somewhat jet-like effect in commingling the metal halide vapors with the advancing stream of air and/or oxygen and in sweeping the admixture toward the orifice at the tip of tube 12a.

Tube 14 (not shown in FIGURE 5), and which supplies a hydrogen feed to the burner, is positioned with respect to tube 12a in the same manner shown in FIGURES 1, 2 and 3 with regard to tube 12. The operation of the burner and collection system is otherwise the same as hereindescribed with reference to FIGURES 1, 2 and 3.

The operation of the collection apparatus in producing and collecting ultrafine, ultrapure silica is as follows: The internal temperatures of containers 36 and 40 are raised to about 110° C. as indicated by glass-encased thermocouples. An air flow of a few cubic feet per hour is created by blower 48. The arrows in FIGURE 1 indicate the direction of flow. The burner 10 is positioned, for example, as shown in this same figure. The flame 60 is directed through a restricted opening or entrance tube or port 33 located in an upper part of the side wall of container 32. As shown in FIGURE 1, the flame is competely isolated from wall contact in the said entrance tube by a cylindrical blanket of, for example, secondary air and/or oxygen. The secondary air stream may be omitted, if desired, and a stream of an inert gas (e.g., nitrogen, helium, carbon dioxide, argon, etc.) substituted therefor. Alternatively, one may increase the proportion of oxygen in the admixture of O₂ and SiCl₄ although with decreased efficiency, i.e., decreased yield of SiO₂.

Collection of silica occurs by a combination of gravitational settling, impingement and agglomeration in the silica-passivated collection containers 32, 36 and 40 at an optimum temperature of approximately 120° C. By-product hydrogen chloride and water vapor are withdrawn through the conduit or discharge outlet 52. The particle size of the collected silica, which is in the 20 mμ to 300 mμ range, appears to be a function of the burner stoichiometry and flame temperature. The by-products, HCl and H₂O, are found in the silica product in a proportion that depends to a large extent upon the product-collection temperature and the aforementioned burner stoichiometry.

Examples of the major metal oxides found in the silica product of typical runs, which product was produced by hydrolysis of electronic-grade SiCl₄ in burner 10 at flame temperatures above 1000° C., are given in Table I. The ratio of silicon tetrachloride, hydrogen and oxygen was approximately 1:2.5:1.5 molar.

TABLE I.—MAJOR METAL OXIDE IMPURITIES IN SILICA PRODUCT IN PARTS PER MILLION (P.P.M.)

|    | I   | II  | III |
|----|-----|-----|-----|
| Al | 6   | 11  | 7   |
| Ba | 1   | <1  | 1   |
| Cu | 3   | 3   | 2   |
| Fe | 2   | 3   | 3   |
| Mg | 2   | 2   | 3   |
| Mn | 1   | 1   | 1   |
| Ti |     |     |     |
| Zr |     |     |     |
| Li | <1  | <1  | <1  |
| Na |     |     | ~4  |
| Ca | 1   | 1   | 1   |

Analyses of the electronic-grade SiCl₄ introduced into the burner in two typical runs are given in Table II.

TABLE II.—MAJOR METAL OXIDE IMPURITIES IN ELECTRONIC GRADE SILICON TETRACHLORIDE (P.P.M.)

| Sample: | I | II |
|---|---|---|
| Al | 10 | 19 |
| Ba | | |
| Cu | 4 | 5 |
| Fe | 13 | 34 |
| Mg | 23 | 61 |
| Mn | 1 | 1 |
| Ti | | |
| Zr | | |
| Li | <1 | <1 |
| Na | ~2 | ~4 |
| Ca | 1-5 | 1-5 |

Modification of the invention

The present invention may be modified in many different ways, more particularly by introducing modifying or effect ingredients into the flame 60 during the production of the ultrafine, ultrapure silica so that a modified silica product is obtained. For example, the invention provides a convenient means of producing silica modified with an effect agent, e.g., a rare earth-metal component such as the oxide. In this preferred modification of the instant invention there is first produced a finely divided silica "smoke" intimately mixed with a uniformly dispersed fog or mist of an aqueous dopant comprising a water-insoluble salt of a rare earth-metal.

As has been previously pointed out, the reaction of $SiCl_4$ with water in an oxygen- (and/or air-) hydrogen flame at temperatures of the order of 1000° C. and above takes place, when the present invention (including this modification) is practiced, in a containerless (substantially containerless) flame. Hydrolysis of the $SiCl_4$-oxygen and/or air stream occurs at the interface and within the hydrogen cone that envelops the said stream.

A finely divided fog or mist produced by the nebulization of a water solution of a water-soluble, rare earth-metal salt, e.g., terbium and/or europium nitrate or chloride, is directed into the flame zone (more particularly into the outer core thereof) of the above-described flame and wherein the hydrolysis of $SiCl_4$ to produce $SiO_2$ and HCl is occurring. The dopant is preferably introduced just beyond the intersection of the two impinging gas streams; or, if desired, it may be introduced further down stream but with less effectiveness. The ultrapure silica is formed and doped within and immediately after leaving the high-temperature flame zone.

Aqueous dopants containing rare earth-metal nitrates impart a red color to the flame due to the decomposition of the nitrate to its respective rare earth-metal oxide and nitrogen dioxide. The rare earth-metal chlorides undergo partial or complete vaporization at the elevated temperatures of the flame.

The modified silica is collected in a silica-passivated collection system in the same manner as previously has been described with reference to FIGURE 1.

The modified silica smokes, more particularly those wherein the rare earth-metal dopant comprises a water-soluble terbium and/or europium salt, do not fluoresce under a 2537 A. ultraviolet light indicating that the rare earth was present in the form of its oxide. However, when samples of these doped or modified silicas were fused to form a glass, fluorescent silica products were obtained.

Ultrapure, ultrafine silicas modified with a rare earth-metal component are useful in making luminescent (e.g., ultraviolet-fluorescent, phosphorescent, cathodoluminescent, etc.) glasses; or as components thereof (e.g., in making a coating on glasses or other substrates); or the glasses (or less satisfactorily the aforementioned modified silicas) may be used as neutron absorbers; and for other purposes.

Referring now to FIGURE 4 there is schematically shown by way of illustration a burner 10, which is constructed and operated as hereinbefore has been described with particular reference to FIGURES 1, 2 and 3 with the following exceptions: instead of tube 12 being in a horizontal plane and tube 14 in a vertical plane as shown in FIGURES 1, 2 and 3, both feed reactant tubes 12 and 14 are in a horizontal plane in the arrangement illustrated in FIGURE 4, and the dopant-containing mist is introduced into the flame from the bottom of the flame and pointed in the general direction of the forward part of the flame. If desired, the aforesaid mist may be introduced into the flame from the top and pointed, preferably, as above described with reference to the introduction of the mist from the bottom of the flame. This burner is utilized in connection with the collection system illustrated in FIGURE 1 and the construction and operation of which also have been previously described.

An effect or modifying agent such as a rare earth-metal compound is introduced into the outer core of the flame zone, as illustrated in FIGURE 4, to produce a modified flame 72. Such an effect agent is introduced into the flame from the nebulizer 74 through the conduit 76, which later is formed, for example, of fused-silica tubing of 12 mm. I.D. and having an opening of the same diameter at each end.

The nebulizer 74 is comprised of a main body member or container 78 having a bottom wall 80 through an opening in which passes the conduit 82 for use in carrying an oxygen-supplying gas, more particularly oxygen and/or air, to the atomizer 84 within the container 78. A dopant 85 comprising a water solution (i.e., an aqueous solution) of a water-soluble rare-earth salt is placed, in practicing this embodiment of the invention, in the container 78 in an amount such that the level thereof is below the nozzle 86 of the atomizer 84.

In operation, oxygen and/or air is fed to the atomizer 84 and passes at high velocity through the nozzle 86. This stream of high-velocity oxygen-containing gas passes in front of the exit opening 88 of the suction tube 90, thereby sucking the dopant through the said exit opening of the tube 90. The force of the blast directs the dopant against the ball point 92 attached to the end of the arm 94 of the atomizer, whereby the liquid spray is further subdivided as it falls from the said ball point.

The above-described operation of the nebulizer produces a finely divided mist of (1) oxygen and/or air, (2) water and (3) dopant, which mist is carried upward through the nebulizer and thence through the conduit or tube 76. This conduit passes through an opening 100 in the top wall 102 of the nebulizer, and extends only a short distance within the said nebulizer as indicated at 104, which is the lower end of tube 76. As indicated hereinbefore, the opposite end of the tube 76 is advantageously positioned beneath the high-temperature flame zone with its forward edge headed in the general direction of the forward part of the flame. This arrangement provides better assurance that the mist or fog will be carried along the forward path of travel of the flame.

The finely divided droplets of dopant solution entrained in oxygen and/or air are carried into the flame zone of the burner 10, while the larger droplets fall to the bottom of the container where they become admixed with the liquid drawn into the atomizer inlet. It might here be mentioned that nebulization is markedly superior to simple, direct atomization because by this technique a more finely divided, homogeneous droplet size is obtained.

Instead of using oxygen and/or air as above described in introducing the mist or droplets of solution into the flame 72, one may use an inert carrier gas such as, for example, nitrogen, helium, argon, carbon dioxide, etc., in introducing the said mist into the said flame as hereinbefore described with reference to the use of mist containing oxygen and/or air. In this case, however, the efficiency of the operation is less.

The container portion of the nebulizer (i.e. top, bottom and side walls) and all atomizer parts are advantageously formed of polyolefin, e.g., polyethylene, polypropylene, copolymers of ethylene and proylene or other olefins, and the like. However, any material of construction may be employed in making the nebulizer that is resistant to attack by the dopant solution and that will introduce a minimum amount of impurities (particularly metallic impurities), if any, into the modified silica product.

The amount of water-soluble rare earth-metal salt which is dissolved in water, and the resulting solution then introduced into the nebulizer, depends, for example, upon the chosen salt, its solubility in water, the amount desired to be introduced into the flame, which latter in turn depends upon the amount of rare earth-metal component (e.g., oxide) desired in the modified silica product, the chosen operating conditions under which the silica is produced, the chosen conditions of operating the nebulizer, and other influencing factors. The amount of water-soluble, rare-earth salt in the aqueous solution comprising the dopant ranges, for example, from about 0.1 g./liter up to a saturated solution at 50° C. Ordinarily, however, such a salt is used in an amount corresponding to from about 0.1 g./liter to about 100 g./liter. Obviously, no more rare-earth salt should be employed than is necessary to produce the desired degree of modification of the silica product with rare earth-metal component.

Any water-soluble, rare-earth salt may be employed but we prefer to use the nitrates or chlorides. Illustrative examples of salts of the rare-earth metals that may be used are the following water-soluble salts of—

Lanthanum:
- Acetate
- Bromate
- Bromide
- Chloride
- Molybdate
- Nitrate
- Sulfate Cerium:
- Acetate(ous)
- Bromate(ous)
- Carbonate(ous)
- Chloride(ous)
- Nitrate(ous)
- Selenate(ous)
- Sulfate(ous)

Praseodymium:
- Acetate
- Bromate
- Chloride
- Selenate
- Sulfate

Neodymium:
- Acetate
- Bromate
- Bromide
- Chloride
- Nitrate
- Sulfate

Samarium:
- Acetate
- Bromate
- Chloride
- Sulfate

Europium:
- Sulfate
- Chloride
- Nitrate

Gadolinium:
- Acetate
- Bromide
- Chloride
- Nitrate
- Selenate
- Sulfate

Terbium:
- Chloride
- Nitrate
- Sulfate

Dysprosium:
- Acetate
- Bromate
- Chloride
- Chromate
- Nitrate
- Selenate
- Sulfate Erbium:
- Chloride
- Nitrate
- Sulfate Thulium:
- Chloride Ytterbium:
- Acetate
- Chloride
- Sulfate Lutetium:
- Sulfate Water-soluble salts of yttrium, e.g., yttrium chloride, nitrate or sulfate, also may be used. Although yttrium is not classified among the rare-earth elements in Mendeleev's Table of the Periodic Arrangement of the Elements, it functions in the same way as do those rare-earth metals listed in said table (water-soluble salts of which have been given above by way of example). Hence those skilled in the art presently consider yttrium among the rare-earth elements, and this is the classification given it in this specification.

Prior to the above-described modification of the instant invention the doping of finely divided, ultrapure silica with rare-earth compounds was accomplished by a series of steps, one of which involved the sorption of the respective rare-earth metal ion or combination of different rare-earth metal ions in finely divided silica smoke in a water solution.

The prior art technique is greatly simplified and a product is obtained at lower cost and of improved quality by practicing this modification of this invention. This is because:

(1) Water-soluble, rare-earth metal salts are introduced into the silica smoke during its formation at temperatures at or above about 1000° C.

(2) Only a single operation is necessary to prepare a finely divided doped silica smoke.

(3) The doped silica smoke is of a much smaller particle aggregate size than doped silica smoke obtained by previous techniques.

(4) The doped silica smoke contains a lower level of extraneous impurities such as Al, Mg, Mn, Na, Ca, V, etc., than the doped silica smoke prepared by prior methods.

In order that those skilled in the art may better understand how the present invention may be carried into effect, the following examples are given by way of illustration and not by way of limitation. All parts and percentages are by weight unless otherwise stated. Also, unless otherwise stated, the apparatus employed is that described hereinbefore with reference to FIGURES 1 through 5. Examples 1 through 9 are given in the form of three tables, viz., Tables III and IV with reference to the preparation of unmodified silicas; and Table V giving conditions for the production of dope silicas. No flow meters are used during the test runs in order to prevent the introduction of extraneous impurities in the reactant gases.

The total volume of gases consumed has been calculated in two ways: Where cylinder pressure drop measurements are made, the gas volumes are calculated for standard temperature and pressure conditions (S.T.P.) 760 mm. and 273.16° K). Where no such data are available [air (Table III)], total gas volumes passed through the $SiCl_4$ saturater are calculated on the basis of a standard formula (Glasstone, S., "Textbook of Physical Chemistry," D. Van Nostrand Company, Inc., 2d ed., 1956, p. 448). Measured variable such as saturater temperature, total loss in weight of saturater, and atmospheric pressure are used. All gas volumes have been converted to moles of the particular gaseous reactant. These data are marked in Tables III and V with an asterisk (*). Secondary air flows are estimated to be about 28 liters/minute in all runs. This flow is powered by natural convection through the silica unit due to the air movement through the hood in which the silica unit is operated.

With more particular reference to Table V and the preparation of doped silicas, the lower values of the doping ranges are calculated assuming 100% introduction of dopant to the burner and with the collection efficiency as given in Table V. The upper values of the stated ranges are calculated on the assumption that there is 100% introduction of dopant to the burner with the entire collection of dopant occurring within the body of $SiO_2$ collected. From this it will be seen that the further assumption has been made that no dopant has been lost from the unit along with uncollected silica and by-product gases.

TABLE III.—PREPARATION DATA ON SILICA

| Example No | 1 | 2 | 3 |
|---|---|---|---|
| Operating time (min.) | 95.00 | 100.00 | 190.00 |
| Hydrogen (moles) | 8.00 | 11.40 | 11.40 |
| Air (moles) | 7.86* | 9.52* | 13.60* ($O_2$) |
| Silicon tetrachloride (moles) | 2.62 | 2.35 | 3.08 |
| Silicon dioxide (moles) | 0.91 | 1.26 | 1.60 |
| Secondary air flow rate (liters/min.) | Ca. 28.00 | Ca. 28.00 | Ca. 28.00 |
| Overall efficiency (percent) | Ca. 35.00 | 53.00 | 52.00 |

Analyses of the silicas of Examples 1, 2 and 3 for major metal oxide impurities have been given in Table I, supra, where corresponding roman numerals represent the respective analytical data obtained upon analysis of the silicas of each of the foregoing examples.

TABLE IV

| Example No | 4 | 5 | 6 |
|---|---|---|---|
| Operating time (min.) | 150.00 | 110.00 | 140.00 |
| Hydrogen (moles) | 6.84 | 5.70 | 5.70 |
| Air (moles) | 15.60 | 17.60 | 22.20 |
| Silicon tetrachloride (moles) | 3.97 | 3.53 | 3.97 |
| Silicon dioxide (moles) | 1.43 | 1.48 | 1.90 |
| Secondary air flow rate (liters/min.) | 28.00 | 28.00 | 28.00 |
| Overall efficiency (percent) | 36.00 | 42.00 | 48.00 |

TABLE V
PREPARATION OF DOPED SILICAS

| Example No | 7, Using $Tb(NO_3)_3 \cdot 6H_2O$ | 8, Using $TbCl^3$ | 9, Using $Tb(NO_3)_3$ and $Eu(NO_3)_3$ |
|---|---|---|---|
| Operating time (min.) | 60.00 | 65.00 | 60.00 |
| Hydrogen (moles) | 10.26 | 2.51 | 7.25 |
| Saturater air (moles) | 10.56 | 10.59 | 6.30 |
| Nebulizer (oxygen) (moles) | | | 12.80 |
| Silicon tetrachloride (moles) | 3.52 | 3.53 | 3.35 |
| Dopant conc. (grams/ml.) | 0.0314 | 0.0490 | $Tb(NO_3)_3$-0.0400 |
| Total ml | 19.00 | 11.00 | 15.00 |
| Grams/ml | | | $Eu(NO_3)_3$-0.00405 |
| Total ml | | | 15.00 |
| Doped silicon dioxide (moles) | 1.10 | 0.766 | 0.475 |
| Doping range, atomic p.p.m | [1] 370–1,200 | [1] 570–2,600 | [1] 52–370 and [2] 53–385 |
| Secondary air (liters/min.) | 28.00 | 28.00 | 28.00 |
| Overall efficiency (percent) | 31.00 | 22.00 | 14.00 |

[1] P.p.m. (terbium).
[2] P.p.m. (europium).

Example 10

This example illustrates the production of finely divided, ultrapure boric oxide (mainly $B_2O_3$).

Essentially the same procedure is followed as described in Example 3 with the exception that ultrapure $BCl_3$ (B.P. about 12.6° C.) is used instead of ultrapure $SiCl_4$, and the molar ratios of $BCl_3:H_2:O_2$ employed are 4:8:4, respectively. If desired, the aforementioned molar ratios of $BCl_3:H_2:O_2$ may be 4:6:3, respectively, which represents the theoretical minimum stoichiometrical amount required for complete conversion of $BCl_3$ to $B_2O_3$.

A good yield of finely divided, ultrapure boric oxide is obtained.

Example 11

This example illustrates the preparation of finely divided, ultrapure germanium oxide ($GeO_2$).

The procedure is essentially the same as described in Example 2 with the exception that 0.235 mole of $GeCl_4$ (B.P. about 86.5° C.) is used instead of 2.35 moles of $SiCl_4$.

Finely divided, ultrapure $GeO_2$ is obtained in a yield of less than 0.1 mole.

In the following examples the apparatus employed is modified slightly from that used in the previous examples, and is essentially the same as that described in a portion of this specification prior to the examples with particular reference to FIGURE 5. More particularly, tube 12 (FIGURE 1) is enclosed by a quartz-lined jacket from a point immediately in front of Teflon fitting 28 (FIGURE 1) to a point close to the tip of the said tube. This jacket also envelops a container or bulb formed of borosilicate glass into which the halide reactant is charged. A conduit of fused quartz is connected to tube 12 near the portion of said tube adjacent its tip but within the jacket.

The container or bulb is heated to the temperature required by any suitable means, e.g., by an electrical resistance unit, in order to vaporize the halide reactant charged to the aforesaid container. Additionally, the oxygen and/or air that is fed to tube 12 is preheated to approximately the boiling point of the halide reactant.

Using the above apparatus and preheat-treatment of the $O_2$ and/or air feed, the following products are prepared in the manner described in Examples 12–14.

Example 12

This example illustrates the production of finely divided, ultrapure silica using $SiBr_4$ as a reactant instead of ultrapure $SiCl_4$.

The procedure is the same as described in Example 1 with the following exceptions:

Instead of 2.62 moles of $SiCl_4$ there is used 0.13 mole of $SiBr_4$; 0.4 mole of $H_2$ is employed in place of 8.0 moles; and, instead of 7.86 moles of air, there is used 0.39 mole of air and 0.1 mole of added $O_2$. The mixture of air and added oxygen is preheated to about 160° C. by heating the quartz tube through which it passes by means of an electrical resistance wire wound about the tube. The container to which the $SiBr_4$ is charged is heated to a temperature such that the $SiBr_4$ will distill into tube 12.

Finely divided $SiO_2$ is obtained in a yield of about 0.05 mole.

Example 13

This example illustrates the preparation of $TiO_2$ using ultrapure $TiCl_4$ as a reactant.

The apparatus and procedure are the same as used in Example 12 with the following exceptions:

Instead of 0.13 mole of $SiBr_4$ as in Example 12, there is employed 1.3 moles of $TiCl_4$; in place of 8 moles of $H_2$ there is used 6 moles of $H_2$; and instead of the mixture of air and oxygen employed in Example 12 there is used 6 moles of oxygen. Also, the oxygen feed is preheated to about 140° C. instead of the 160° C. to which the mixture of air and oxygen was preheated in Example 12.

Finely divided, ultrapure $TiO_2$ is obtained in a yield of about 0.4 mole.

Example 14

This example illustrates the preparation of tin oxide ($SnO_2$) from $SnCl_4$ as a reactant.

The apparatus and procedure are the same as in Example 12 with the following exceptions:

Instead of 0.13 mole of $SiBr_4$, there is used 0.10 mole of $SnCl_4$; instead of 0.4 mole of $H_2$ there is employed 0.5 mole of H₂; and in place of 0.39 mole of air and 0.1 mole of added O₂ there is used 0.25 mole of O₂. Also, the oxygen feed is preheated to about 118° C. instead of the 160° C. to which the mixture of air and oxygen was preheated in Example 12.

A good yield of finely divided, ultrapure SnO₂ is obtained.

It will be understood, of course, by those skilled in the art that our invention is not limited only to the production of the finely divided, ultrapure unmodified and modified oxides using the particular ingredients, proportions thereof, conditions of operation, etc., set forth in the foregoing examples by way of illustration. Thus, instead of the specific perhalides employed in the foregoing examples, in a similar manner one may use the perhalides, more particularly the perchlorides, perbromides and perfluorides of aluminum, zirconium and selenium and of other elements of the groups and subgroups of Mendeleev's Periodic Arrangement of the Elements, of which the foregoing elements are members, thereby to obtain the corresponding oxides.

As will be apparent to those skilled in the art, modifications of the present invention can be made or followed in the light of the foregoing disclosure without departing from the spirit and scope of the disclosure or from the scope of the claims.

We claim:
1. The combination of
 I. a burner adapted for the production of a flame of the conical-diffusion type which consists essentially of
  (A) two reactant feed tubes adapted to carry different reactants including hydrogen in one and an oxygen containing gas in the other, having an orifice in the end of each tube and which are positioned at an angle of from about 85° to about 95° with respect to each other, and an unconfined reaction zone forward of one of the said reactant feed tubes; and
  (B) a support for the said reactant feed tubes; and
 II. a product-collection unit having an entrance port for the reception of the products formed in the flame of the said burner when it is in operation, said entrance port being spaced apart from the exit ends of the two reactant feed tubes at a distance such that in operation the flame of the burner is directed into the said entrance port while the flame is simultaneously surrounded by a blanket of secondary gas, the space between the said entrance port and the exit ends of the two reactant tubes defining said unconfined reaction zone.

2. The combination as in claim 1 wherein the two reactant feed tubes of the burner are positioned at an angle of about 90° with respect to each other.

3. The combination as in claim 1 wherein the two reactant feed tubes of the burner are positioned at an angle of about 90° with respect to each other and in approximately the same horizontal plane.

4. The combination as in claim 1 wherein one of the reactant feed tubes of the burner is positioned in a horizontal plane and the other in a vertical plane, and the two reactant feed tubes are positioned at an angle of about 90° with respect to each other.

5. The combination as in claim 4 wherein the reactant feed tube positioned in a vertical plane is slightly forward and slightly below the reactant feed tube positioned in a horizontal plane.

6. The combination as in claim 1 wherein each of the reactant feed tubes of the burner is at least in part composed of fused silica tubing.

7. The combination as in claim 1 wherein the product-collection unit that is spaced from the exit ends of the two reactant tubes of the burner at the distance defined in claim 1 is a combination product-collection and by-product disposal unit comprising:
 (a) a series of containers having interconnecting conduits from the upper portion of each, the first of said containers having an entrance port in a sidewall in which the flame from said burner enters;
 (b) a jacket enveloping at least one of the containers of (a) that follows the first container in the series;
 (c) means for heating the interior of said jacket; and
 (d) means for exhausting by-product gases from the last one of the containers of (a).

8. The method of producing finely divided oxides derived from at least one perhalide selected from the group consisting of volatile perhalides of metals and metalloids, said method comprising forming a conical-diffusion type of flame from a burner by bringing together two impinging gas streams A and B at a predetermined angle with respect to each other that is within the range of 85°–95°, gas stream A being a hydrogen-supplying gas and gas stream B being a gaseous mixture of an oxygen-supplying gas and at least one perhalide selected from the group consisting of volatile perhalides of metals and metalloids, the said flame having a burning cone of gas stream A that envelops a cone of gas stream B whereby hydrolysis and subsequent dehydration of the aforesaid halide takes place at the interface and within the burning cone of gas stream A; directing the said flame into the entrance port of a mechanical, non-liquid collection system while the flame is simultaneously surrounded by a blanket of a secondary gas; and collecting the resulting finely divided oxide having a high degree of purity.

9. The method of producing finely divided silica which comprises forming a conical-diffusion type of flame from a burner which comprises bringing together two impinging gas steramns A and B at an angle of about 90° with respect to each other, gas stream A being hydrogen and gas stream B being a mixture of gaseous silicon tetrachloride and an oxygen-containing gas selected from the group consisting of oxygen, air and mixtures of oxygen and air, the said flame having a burning cone of hydrogen of gas stream A that envelops a cone of gas stream B whereby hydrolysis and subsequent dehydration of the silicon tetrachloride takes place at the interface and within the said burning hydrogen cone; directing the said flame into the entrance port of a mechanical, non-liquid collection system while the flame is simultaneously surrounded by a blanket of secondary air; and collecting the resulting finely divided silica having a high degree of purity.

10. The method as in claim 9 wherein one of the impinging gas streams is in a substantially horizontal plane and the other is in a substantially vertical plane.

11. The method as in claim 9 wherein both of the impinging gas streams are in substantially the same plane.

12. The method as in claim 11 wherein both of the impinging gas streams are in substantially the same horizontal plane.

13. The method as in claim 9 wherein the hydrogen of gas stream A and the total oxygen in the oxygen-containing component of gas stream B are such as will provide, upon reaction of the said gas streams, a molar ratio of water to silicon tetrachloride in excess of 2:1.

14. The method as in claim 9 wherein the oxygen-containing gas of stream B is oxygen, and the proportions of reactants in gas streams A and B are within the range of approximate molar ratios of $SiCl_4:H_2:O_2$ of from 1:2:1, respectively, to 1:10:5, respectively.

15. The method as in claim 14 wherein the proportions of reactants in gas streams A and B are in the approximate molar ratio of $SiCl_4:H_2:O_2$ of 1:2:1, respectively.

16. The method as in claim 9 wherein the oxygen-containing gas of stream B comprises air, and the proportions of reactants in gas streams A and B are within the range of approximate molar ratios of SiCl$_4$:H$_2$:air of from 1:2:5, respectively, to 1:10:25, respectively.

17. The method as in claim 10 wherein the oxygen-containing gas of stream B consists of air, and the proportions of reactants in gas streams A and B are in the approximate molar ratio of SiCl$_4$:H$_2$:air of 1:2:5, respectively.

18. The method of producing a finely divided silica product modified with a rare earth-metal component which comprises bringing together two impinging gas streams A and B at an angle of about 90° with respect to each other thereby to form a conical-diffusion type of flame, said gas streams being in substantially the same plane, gas stream A being hydrogen and gas stream B being a mixture of gaseous silicon tetrachloride and an oxygen-containing gas selected from the group conesisting of oxygen, air and mixtures of oxygen and air, the said flame having a burning cone of hydrogen of gas stream A that envelops a cone of gas stream B whereby hydrolysis and subsequent dehydration of the silicon tetrachloride takes place at the interface and within the said burning hydrogen cone; introducing into the said flame a mist of (1) water, (2) a water-soluble salt of a rare-earth metal and (3) an oxygen-containing gas selected from the group consisting of oxygen, air and mixtures of oxygen and air, so that the above-described reaction of the silicon tetrachloride takes place in the presence of the said mist; directing the said flame into the opening of a collection unit while the flame is simultaneously surrounded by a blanket of secondary air; and collecting the resulting finely divided silica modified with a rare earth-metal component.

19. The method as in claim 18 which includes the additional step of nebulizing, with an oxygen-containing gas selected from the group consisting of oxygen, air and mixtures of oxygen and air, an aqueous solution of a water-soluble salt of a rare-earth metal thereby to form a mist, which is subsequently introduced into the said flame, of (1) water, (2) the said water-soluble salt and (3) the said oxygen-containing gas.

20. The method as in claim 18 wherein gas streams A and B are in substantially the same horizontal plane, and the mist of oxygen-containing gas, water and water-soluble salt of a rare-earth metal is introduced into the flame beneath its high-temperature flame zone.

21. The method as in claim 18 wherein the water-soluble salt of a rare-earth metal is at least one member of the group consisting of the chlorides and nitrates of europium and terbium.

References Cited

UNITED STATES PATENTS

| | | | |
|---|---|---|---|
| 1,418,528 | 6/1922 | Burgess | 23—264 X |
| 2,068,892 | 1/1957 | Schweitzer et al. | 117—105.2 X |
| 2,824,784 | 2/1958 | Hanson et al. | 23—182 X |
| 2,990,249 | 6/1961 | Wagner | 23—142 |
| 3,002,808 | 10/1961 | LaMont | 23—142 |
| 3,297,414 | 1/1967 | Mazdiyasni et al. | 23—345 |

JAMES H. TAYMAN, JR., *Primary Examiner.*

U.S. Cl. X.R.

23—139, 140, 142, 182, 202, 262, 277, 284; 117—33.5, 106; 176—93; 252—62.3